May 19, 1925.  
W. E. DUNSTON  
BUMPER SUPPORTING MEANS  
Filed Jan. 28, 1924  
1,538,426
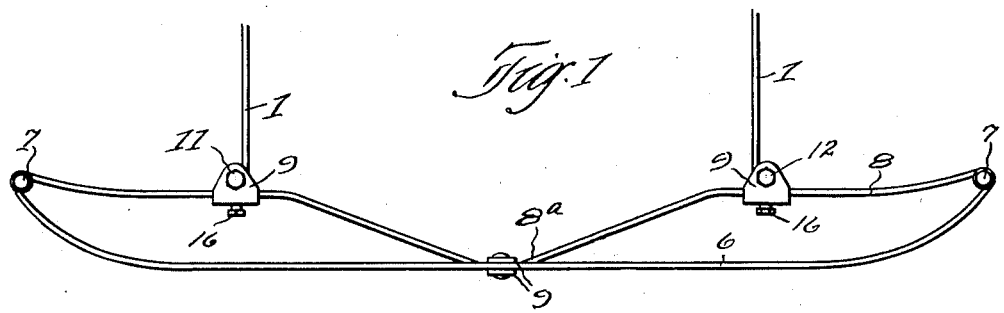
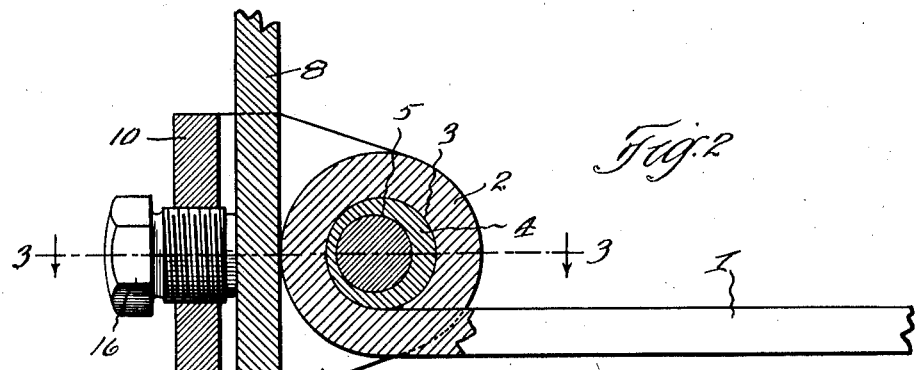
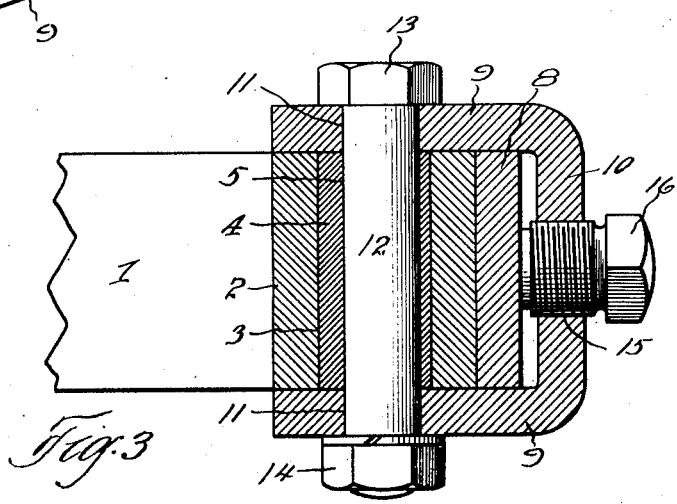
Inventor  
Wayne E. Dunston,  
BY Hull, Brock & West,  
Attys.

Patented May 19, 1925.

1,538,426

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER-SUPPORTING MEANS.

Application filed January 28, 1924. Serial No. 689,008.

*To all whom it may concern:*

Be it known that I, WAYNE E. DUNSTON, a citizen of the United States, residing at Detroit, in the county of Wayne and State of Michigan, have invented a certain new and useful Improvement in Bumper-Supporting Means, of which the following is a full, clear, and exact description, reference being had to the accompanying drawings.

This invention relates to means for supporting bumpers from automobiles or similar vehicles and has for its general object to provide a simple and efficient means for adjustably securing bumpers to such supporting means. More limitedly, the invention comprises a clamp, which is adapted to form a pivotal connection between a bumper bar and an eye formed upon a supporting arm, with means whereby the rotation of the clamp about its pivot, by deflection of the bumper under impact, will be automatically limited.

Further and more limited objects of the invention will appear hereinafter, in connection with the detailed description of the invention, and will be realized in and through the combinations of elements presented in the claims.

In the drawings, Fig. 1 represents a plan view of a bumper and its supporting arms, having my invention applied thereto; Fig. 2 a sectional plan view of the means for securing the bumper to one of the supporting arms; and Fig. 3 a vertical sectional view corresponding substantially to the line 3—3 of Fig. 2.

Describing the various parts by reference characters, 1, 1 denote the supporting arms by which the bumper is secured to the end portions of the vehicle side members (not shown). Each of these arms is provided at its front or bumper-supporting end with an eye 2. Each eye 2, as will appear by reference to Figs. 2 and 3, is formed with a circular bore 3 in which is mounted a bushing 4 having a bore 5 which is eccentrically located with respect to the bore 3. The bumper shown herein, and which is to be supported by the arms 1, is of the type shown in McGregor Patent 1,372,154, issued March 22, 1921, said bumper comprising a pair of vertically spaced impact bars 6 having their ends connected, by bolts 7, with the ends of the rear or auxiliary bar 8, the central portion 8ᵃ of which is projected between and secured to the bars 6 by means of the arms 9 of a clamping device. The bumper in its details forms no part of the invention covered by this application, the one shown being selected for purposes of illustration and as providing a bar 8 by means of which the bumper may be secured to the arms 1. As will be noted from Fig. 3, the bar 8 is of the same width as the arms 1, for convenience of applying the clamping device to the parts.

A clamping device is applied to the eye of each of the arms 1, the said devices being identical in construction. Each device comprises a stirrup or U-shaped member having top and bottom arms 9 and a vertical connecting web 10, the web 10 being of such height or width as to enable the arms 9 to be slipped upon the bar 8 and the eye 2, said flanges engaging the upper and lower surfaces of said bar and eye. The arms 9 are provided with apertures 11, preferably of the same diameter as the bore 5, such apertures and bore being adapted to receive a pivot bolt 12, having a head 13 at one end and a nut 14 at the opposite end.

The vertical web 10 is provided with a centrally arranged threaded bore 15 which is adapted to receive an adjusting stud 16.

It will be noted that the bushing 4 is arranged with its thin or narrow wall facing forwardly or toward the bar 8; and the bore 5 and the apertures in the plates 9 are so arranged that, when the bolt 12 is passed through such bore and apertures, the front of the eye 2 will engage the adjacent face of the bar 8, the said bar being clamped between the said eye and the adjusting stud 16.

With the parts arranged as shown and described, when the bumper receives a blow causing a deflection thereof, such deflection would tend to rotate the clamping devices about their pivot bolts. Because of the arrangement of the bushing 4, this rotary movement will cause the bushing to thrust the eye forwardly or toward the bar 8, the eye being in effect wedged against the bar and thus gradually and increasingly resisting and finally checking the rotary movements of the clamping devices about their respective pivots.

Having thus described my invention, what I claim is:—

1. The combination, with a bumper bar, of a clamping device comprising a pair of members adapted to receive the said bar therebetween, a supporting arm having an eye at the outer end thereof, means carried by said arm for adjustably pivoting the said eye to the said member of the clamping device, and means carried by said clamping device and adjustable toward and adapted to engage the side or face of the bar which is opposite said eye.

2. The combination, with a bumper bar, of a clamping device comprising a pair of members adapted to receive the said bar therebetween, a supporting arm having an eye at the outer end thereof, means adjustably pivoting the said eye to the aforesaid members, and means carried by said clamping device and adjustable toward and adapted to engage the side or face of the bar which is opposite said eye.

3. The combination, with a bumper bar, of a U-shaped clamping device having a web or body at one side of said bar and an upper and a lower arm extending across the top and bottom of said bar, a supporting arm having an eye at the outer end thereof, a bushing in said eye having a bore arranged eccentrically with respect to the bore of said eye, a bolt extending through said bushing and mounted in the said arms, and a stud threaded in the web or body of the said clamping device and adapted to engage the face of said bar which is adjacent to said body.

4. The combination, with a bumper bar, of a clamping device adapted to receive the said bar, a bumper-supporting arm having an attaching portion, means for pivotally securing the said attaching portion to the said clamping device and in substantial engagement with the adjacent face or side of the said bar, means carried by said clamping device and adapted to engage the side or face of the bar which is opposite or remote from the said attaching portion, and means operative by the rotary movement of said device about such pivotal securing means for forcing the said attaching portion against the adjacent face or side of the said bar.

5. The combination, with a bumper bar, of a clamping device adapted to receive the said bar, a bumper supporting arm having a portion adapted to be received by the said clamping device, means for pivotally securing the said portion of said arm to the said clamping device and in substantial engagement with the adjacent face or side of said bar, said device having means adapted to engage the side or face of the bar which is opposite or remote from the attaching portion of said arm, and means operative by rotary movement of said device about such pivotal supporting means for forcing said portion of said arm against the adjacent face or side of said bar.

6. The combination, with a bumper bar, of a clamping device adapted to receive the said bar, a bumper-supporting arm having an eye, means extending through said eye for pivotally securing the said eye to the said clamping device and in substantial engagement with the adjacent face or side of the said bar, means carried by said clamping device and adapted to engage the side or face of the bar which is opposite or remote from the said attaching portion, and an eccentric bushing in said eye and surrounding the pivotal supporting means therefor.

7. The combination, with a bumper having an attaching portion, of a bumper-supporting arm having an eye at the front or outer end thereof, a clamping device adapted to be applied to the said portion of the bumper and to receive said eye, pivotal supporting means carried by the said device and extending through the said eye, and means operative by rotary movement of said device about such supporting means for forcing the said eye against the adjacent portion of the said bumper.

8. The combination, with a bumper bar, of a supporting device having an upper and a lower arm extending across the top and the bottom of said bar, respectively, a bumper-supporting arm, means pivotally connecting the said arm to the said device, said means operating to move the outer end of the arm toward the said bar by rotary movement of said device about such connection, and means carried by said device and adjustable toward and from the opposite side of said bar and adapted to engage the same.

9. The combination, with a bumper bar, of a clamping device adapted to receive the said bar, a bumper supporting arm having a portion adapted to be received by the said clamping device, means for securing the said portion of said arm to the said clamping device and in substantial engagement with the adjacent side of said bar, and adjustable means carried by said device for engaging the side or face of the bar which is opposite or remote from the said attaching portion.

10. The combination, with a bumper bar, of a clamping device comprising a pair of members adapted to receive the said bar therebetween, a bumper-supporting arm having an eye at the front or outer end thereof, means for securing the said eye to the said members, with the eye in substantial engagement with the adjacent side or face of said bar, and means carried by the said clamping device and adjustable toward and adapted to engage the side or face of the bar which is remote from the said eye.

11. The combination, with a bumper having an attaching portion, of a bumper-supporting arm having an attaching portion, a clamping device adapted to be applied to the said portion of the bumper and to receive the attaching portion of the said arm, means for securing the attaching portion of the said arm to the said device, with the attaching portions in substantial engagement, and adjustable means carried by the said device for engaging the opposite side of the attaching portion of said bumper from that engaged by said arm.

12. The combination, with a bumper bar, of a U-shaped clamping device comprising a web and a pair of arms projecting from said web and adapted to receive the bar therebetween, an arm having an eye interposed between said clamping arms, a bolt extending through said eye and said clamping arms and securing the said eye to the clamping arms with the eye in substantial engagement with the adjacent face of said bar, and a set screw mounted in said web and adapted to engage the other face of said bar, thereby to clamp the bar between said eye and said screw.

13. The combination, with a bumper bar, of a U-shaped clamping device comprising a web and a pair of arms projecting therefrom and adapted to receive the bar therebetween, a bumper-supporting member having a portion interposed between the clamping arms, means pivotally connecting such portion of said member to the clamping arms with such portion in substantial engagement with the adjacent face of said bar, and means adjustably mounted in said web and adapted to engage the other face of said bar, thereby to clamp said bar between such means and the aforesaid portion of said bumper-supporting member.

14. The combination, with a bumper bar, of a clamping device having an upper and a lower arm extending across the top and the bottom of said bar, respectively, a bumper-supporting arm having an eye at the front or outer end thereof, means for connecting the said eye to the said arms with its outer end engaging one face of said bar, and means carried by said clamping device for engaging the opposite side or face of said bar.

In testimony whereof, I hereunto affix my signature.

WAYNE E. DUNSTON.